United States Patent Office 2,959,228
Patented Nov. 8, 1960

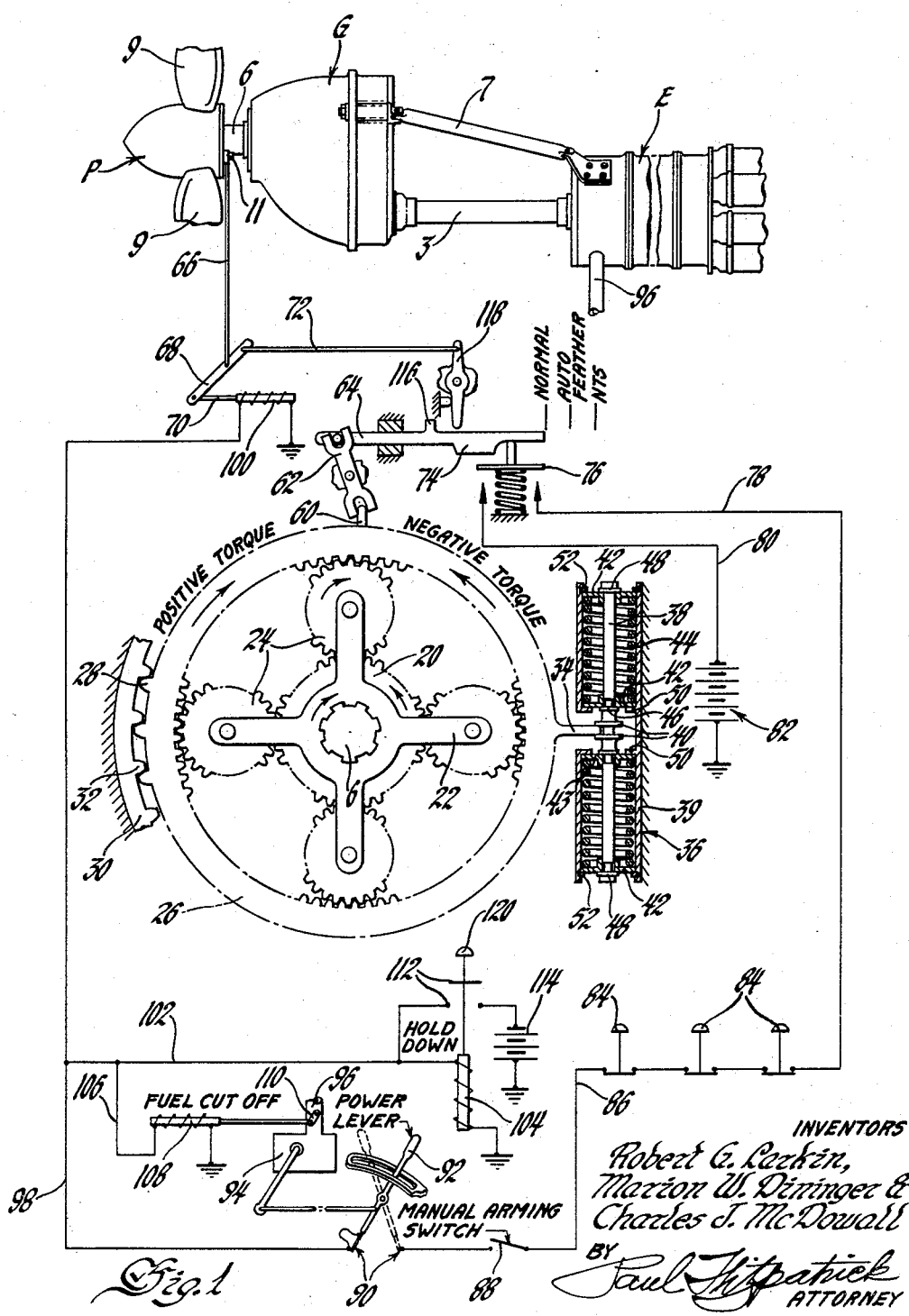

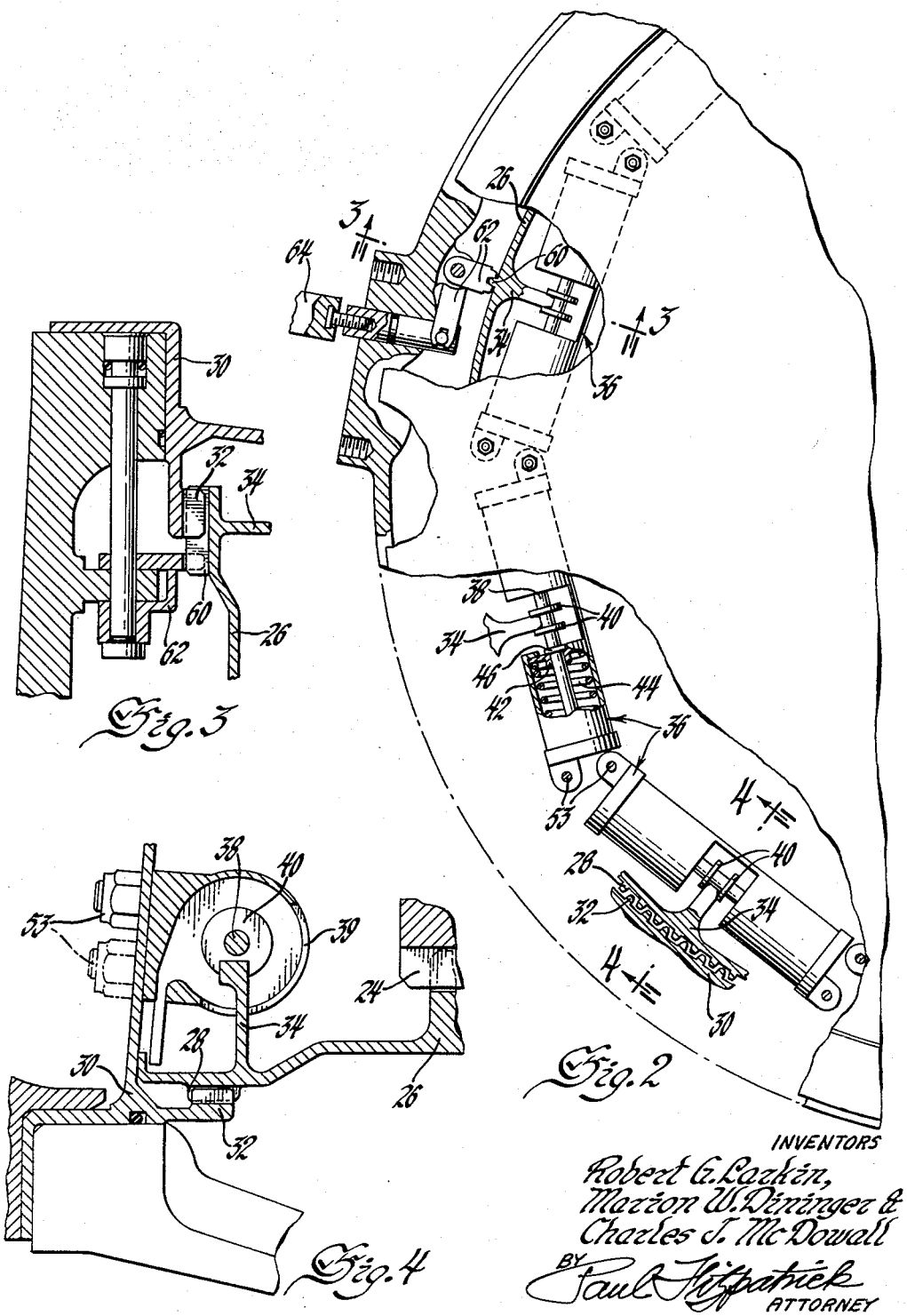

2,959,228

TORQUE RESPONSIVE PROPELLER CONTROL

Robert G. Larkin, Marion W. Dininger, and Charles J. McDowall, Indianapolis, Ind., assignors to General Motors Corporation, Detroit, Mich., a corporation of Delaware Filed May 28, 1957, Ser. No. 660,497

7 Claims. (Cl. 170—135.72)

This invention relates to aircraft propulsion systems and more particularly to aircraft propulsion systems in which a plurality of variable pitch propellers are individually driven by engines.

During normal flight operation the pitch of aircraft propellers is normally controlled by a governor that increases or decreases the blade angle to maintain a constant engine r.p.m. During low power such as conditions such as flight idle, taxi, and reverse conditions, the engine power lever is used to vary the propeller blade angle from a negative angle providing reverse thrust for shortening landing distances to a positive angle. Provision is usually made for feathering the propeller, that is turning the blades almost 90° where they will not windmill or be rotated by the air flow of a ground wind or air flow due to the aircraft moving through the air.

During take-off it is important that in the event of engine failure the drag on the aircraft due to a windmilling propeller is promptly eliminated or minimized. This is especially important in a multi-engine aircraft where a failed engine would cause uneven drag that would make the aircraft difficult or impossible to control. The usual method of minimizing such drag is to feather the propeller upon engine failure. It is desirable that the feathering be prompt and automatic and not require the attention of the pilot who has many other duties to perform during a take-off. Also the fuel supply to the failed engine should be automatically interrupted.

During normal flight or landing procedures there are several conditions where it is important to limit the drag by a windmilling propeller but yet not desirable or necessary to feather the propeller. Such conditions are where the fuel to the engine is temporarily interrupted, where air gusts suddenly change the load on the propeller, where there is a momentary or partial power loss to the propeller.

During landing procedures it is often desirable to utilize negative thrust by a dragging propeller; however this drag should be limited to a safe value. The drag limiting control for normal flight and landing should operate to limit the drag on the aircraft caused by negative thrust but should not feather the propeller or cut out the engine.

It is therefore an object of the invention to provide an aircraft propulsion system having automatic controls for at times eliminating and at other times limiting the drag effect of a propeller that for one reason or another is not producing a proper forward thrust on the aircraft.

It is a further object of the invention to provide an automatic propeller pitch control that will vary the pitch in accord with a device that is sensitive to the direction of propeller thrust on the aircraft or direction or torque drive between the engine and the propeller.

A still further object is to provide a propeller pitch and engine control device that is sensitive to direction and amount of torque on a reaction gear member forming part of a gear train between the engine and propeller.

The present invention combines in a common device a torque sensing means for accomplishing the desired objectives stated above, that is, it will operate to feather the propeller and cut off fuel to the engine in the case of a power plant failure during take-off, and will at other times act to control the propeller pitch so as to limit the negative thrust by the propeller. The first result is accomplished by having the device sensitive to a drop in positive or forward thrust torque to a point below a predetermined amount, and the second result obtained by having the device sensitive to the propeller having more than a predetermined amount of negative torque. The term "positive torque" is used to indicate torque transmitted by the engine to the propeller when the engine is driving the propeller to produce a positive forward thrust, and the term "negative torque" to indicate torque transmitted from the propeller to the engine when the propeller is driving the engine and hence providing a negative thrust or drag on the aircraft.

In general, the invention utilizes a reduction gearing of the planetary type in which a relatively stationary ring gear provides gear reaction for speed decrease and torque multiplication from the engine to the propeller. The reaction gear of the present invention which is a ring gear of the floating type and is not completely held stationary in the gear reduction housing, as is normally the case, but is permitted to have a limited rotational movement between stops on the housing. This movement is in one direction during positive torque conditions and in the other direction during negative torque conditions. The gear movement is resisted by preloaded compression springs are are calibrated to permit movement of the ring gear from a neutral or center position toward one stop, only upon positive torque conditions over a predetermined amount, and toward the other stop, only upon negative torque conditions more than a predetermined amount. The movement of the ring gear away from the positive torque stop is used to control an automatic feathering device. Movement of the ring gear from the neutral or center position toward the negative torque stop is used to control a negative torque signal propeller pitch varying device.

The automatic feathering control is designed so that during take-off, power plant failure and the resultant loss of positive torque on the ring gear to a point below the predetermined amount will cause full feathering of the propeller as well as interruption of fuel to the engine and will act to hold the propeller in feathered position regardless of whether the torque remains below the predetermined positive amount or not. The system provides for manual overcontrol by the pilot so that he can feather the propeller at will but he cannot decrease the pitch of the blade from the feathered position once the propeller has been feathered by the automatic feathering device. The negative torque signal will act during other than take-off conditions to vary the propeller pitch to thereby limit the drag effects of a negative thrust propeller condition to a safe value.

Referring to the drawings in which Fig. 1 is a schematic and diagrammatic representation of the invention;

Fig. 2 is an enlarged view partially broken away of the torque sensing ring gear;

Fig. 3 is a sectional view taken on line 3—3 of Fig. 2 showing details of the torque sensing control; and Fig. 4 is a sectional view taken on line 4—4 of Fig. 2 showing details of the ring gear.

Referring now to the figures which illustrate an embodiment of the invention but which are not to limit the same, Fig. 1, the upper portion of which shows a propulsion power plane, in which E represents an aircraft engine such as a gas turbine, turbo-prop, or other engine. The engine G is connected to drive a propeller shaft enclosed in housing 3 to drive a reduction gearing G that is in turn connected to drive a shaft 6 carrying a variable pitch propeller P that includes variable pitch blades 9. The variable pitch propeller, which may be of any known type, is controlled by a conventional actuating means 11 for varying the pitch of the blades 9. The reduction gearing and propeller are supported by struts 7. The reduction gearing G may be of any suitable design but in the preferred embodiment is of the same general type as that shown in the patent to William R. Bain, No. 2,737,018, and includes a planetary gear set having a driving sun gear, a driven planetary carrier and a reaction ring gear.

The planetary portion of the reduction gearing shown in Fig. 1 includes a sun gear 20 connected to be driven by the engine in a counterclockwise direction, a planet carrier 22 splined on the propeller shaft 6, planet pinions 24 journalled on the carrier 22 meshing with the sun gear 20 and with a ring gear 26. The ring gear 26 is loosely connected by means of splines 28—32 to the stationary gear housing 30.. The splines 28—32 allow a small circumferential movement of the ring gear relative to the stationary housing and the spline teeth 32 on the stationary case act as stops for movement of the ring gear between two extreme positions. As seen in Fig. 2 the ring gear 26 also carries a series of inwardly projecting radial teeth 34, each of which engages a centering unit designated 36. For convenience only one of the teeth 34 is shown in the diagrammatic Fig. 1, and it is shown extending outwardly with the centering units being positioned externally of the ring gear. However, as can be seen in Figs. 2 and 4, in the actual construction there are a plurality of teeth 34 and centering units that are located inwardly of the ring gear. Each centering unit includes a central rod 38 having a land 40 on each side of and engaging its cooperating tooth 34. Loosely mounted on the rod 38 are spring saddles or seats 42 that are positioned by compression spring 44 against suitable abutments 46 and snap rings 48 on the plunger rod 38. Abutments 50 and snap rings 52 act to limit movement of the spring saddle members 42 within the cylindrical housing 39 which, as seen in Fig. 4, is held by bolts 53 to the stationary reduction gear housing 30.

Rotational movement of the ring gear relative to the housing 30 is resisted by the compression springs 44, the movement of the gear 26 being directed against the springs 44 through the teeth 34, lands 40, abutment 46 and saddles 42. The springs 44 can be chosen so that the reaction torque on the ring gear 26 in a positive or negative direction must exceed a predetermined amount before the gear 26 moves teeth 34 to compress the springs. For example, in the preferred embodiment in which there are a total of twenty springs, the springs are preloaded to a total force equivalent to 2,100 foot pounds of torque, which at normal engine operating speed might be equivalent to 400 shaft horsepower. Since a turboprop engine will operate at a substantially constant speed the horsepower will vary as the torque and vice-versa. Thus, it would require more than a positive 400 or a negative 400 horsepower passing through the reduction gear to cause the reaction ring gear 26 to have sufficient torque on it to begin to move it against the centering springs 44.

The springs 44 can be chosen with the proper spring rate such that any given additional horsepower in a positive or negative direction of drive through the gearing is necessary to move the ring gear 26 fully against the stop teeth 32 in the stationary casing. For example, in the preferred embodiment the spring rate is such that with a positive 400 shaft horsepower or less, that is with the engine driving the propeller with 400 horsepower or less, the ring gear 26 will be held in a central position. If the horsepower delivered to the engine by the propeller increases above 400 horsepower the torque reaction on ring gear 26 will be sufficient to move the gear 26 clockwise as viewed in Fig. 1 and when the horsepower reaches 445 positive, the teeth 28 of the ring gear will have moved to engage the stop teeth 32 on the casing 30. Similarly, the negative horsepower, that is with the propeller driving the engine, as long as the horsepower is less than 400 negative, the ring gear 26 will remain centered, but if the negative horsepower rises above 400 the ring gear 26 will begin to move counterclockwise as viewed in Fig. 1 against the springs 44 until at a negative 445 horsepower the teeth 28 will engage the teeth 32 of the stationary housing.

By leaving out one or more of the springs the horsepower settings can be decreased. For example in the preferred embodiment the removal of one of the twenty springs will result in a reduction of the critical torque settings by 5% which would result in figures of 380 and 422.75 H.P. It will be noted that the removal of any spring has the same effect in both directions. Another feature of the double spring centering assemblies is the fact that one or more of the internal spring saddles 42 can be removed so as to effect the torque required to rotate the ring gear in one direction without effecting the preload setting or torque required to rotate the ring gear in the opposite direction. It will be noted from Fig. 1 that if the saddle 43 were removed, the preload would remain the same and rotation of the ring gear 26 clockwise would not compress the spring from which the saddle was removed.

As seen in Figs. 2 and 3, in addition to the relatively short splines 28 on the ring gear 26 there is one relatively long spline tooth 60 that engages a crank lever 62 pivoted in the stationary housing that acts to reciprocate a push rod 64 slidably mounted in the gear housing.

The propeller P has variable pitch blades 9 that are varied by a control member 11 which is operated by a suitable linkage shown diagrammatically in Fig. 1 as the link 66. The propeller, which forms no part of the invention, may be of any suitable type and, for example, may be of the type shown in the patent to J. Stuart III, No. 2,664,959. The link 66 may operate a control device within the propeller that either electrically, mechanically or hydraulically changes the angle of the blades. Movement of the link 66 in one direction will act to increase the pitch and movement in the other direction will act to decrease the pitch. The propeller blades can be varied anywhere from a negative angle position, wherein the propeller produces a reverse thrust, all the way to a high feathered 90° angle position. The link 66 is operated either by a control rod 70 connected to a solenoid 100 energized by the automatic feathering control or by the negative torque signal rod 72 operated by the negative torque signal control.

*Automatic feather control*

Referring now to the automatic feather control which is primarily an electrical system, a cam 74 is provided on the push rod 64 that will close a switch 76 to connect conductors 78 and 80 when the rod 64 is moved from the extreme left hand position shown in Fig. 1 to the right by the splined tooth 60 rotating the crank 62 clockwise. Conductor 80 is connected to a source of electricity 82 which may be any suitable means, but which for representation purposes is shown as a battery. The conductor 78 leads to a series of normally closed switches 84, one switch being provided for each of the other engines in the aircraft. Three switches are shown in Fig. 1 to illustrate application of the invention in a four engine aircraft. The last switch is connected to a conductor 86 that leads to a manual arming switch 88, thence to a power lever control switch 90 that is closed only when the power lever 92 is in its maximum power or take-off position represented by the dotted line in Fig. 1. The power lever 92 acts to control a fuel supply control 94 that varies the fuel rate of flow to the fuel supply conduit 96 of the engine. Other connections from the power lever to manually control the propeller pitch are not shown as they form no part of the invention. From switch 90 the conduit 98 leads to the feathering solenoid 100 and also by means of a conductor 102 to a pull-down and holding solenoid 104. The conductor 98 also leads by means of a conductor 106 to a fuel cut off solenoid 108 that controls a lever 110 that shuts off the supply of fuel into conduit 96 when the solenoid 108 is actuated.

Before take-off the pilot closes the manual arming switch 88 and advances the power lever 92 to the take-off position thereby closing switch 90. The automatic feather circuit is now fully armed. During take-off or at any other time the manual arming switch 88 and the power take-off switch 90 are both closed, and the other engines functioning normally, thereby allowing switches 84 to remain closed, the automatic feather circuit is armed. If there should then be a power failure due to malfunction of the engine E or interruption of the fuel to engine E, the automatic feathering circuit will act to feather the propeller. At any engine power condition greater than a flight idle condition the engine should normally be delivering more than 445 horsepower to the propeller which will cause sufficient torque reaction on the ring gear 26 to move it clockwise against the force of springs 44 until teeth 28 on the ring gear 26 engage the stop teeth 32 in the stationary case 30. If the engine should thereafter fail and the horsepower to the propeller drop below 400 positive, springs 44 will move the ring gear 26 counterclockwise toward its center position, and splined tooth 60 carried by the ring gear 26 will rotate the lever 62 to move the push rod 64 to the right as viewed in Fig. 1. Cam 74 will then close the switch 76 completing the automatic feather circuit. Electricity will then pass from the electrical source 82 through the switch 76, conductor 78, switches 84, conductor 86, manual arming switch 88, power take-off switch 90, and conductor 98 to energize the feather solenoid 100 which, through rings 68 and 66, will move the propeller control to full feather position. At the same time, electricity from conductor 98 flows through conductor 106 to the fuel cut off solenoid 108 to shut off fuel to the engine E. Also, electricity flows from conductor 98 through conductor 102 to the pull-down and hold solenoid 104 which closes a switch 112 connecting a source of electricity 114 to the conduit 102 and the other conduits connected therewith. Thereafter, if the automatic feather switch 76 should open for some reason the hold-down solenoid 104 and switch 112 will keep the electrical source 114 connected to the feather solenoid 100 and the fuel cut off solenoid 108.

After completing the take-off the pilot would normally open the manual arming switch 88 which would prevent any automatic feathering thereafter. Also, the power lever 92 is moved from the power take-off position opening the switch 90 and if for some reason during the flight thereafter the pilot should move the power lever 92 to take-off position for a burst of power, the open manual arming switch 88 will prevent automatic feathering even though the power plant E should fail and cause the automatic feather switch 76 to close.

The pilot can at any time feather the propeller by pushing a button 120 which will close the switch 112 energizing the hold-down solenoid 104, the feather solenoid 100, and the fuel cut off solenoid 108. If for some reason any of the other engines have previously failed causing automatic feathering of their respective propellers, one of the switches 84 will open thereby preventing completion of the automatic feather circuit shown in Fig. 1. It is to be understood that each of the engines and propellers has a complete automatic feather and negative torque signal control system such as that shown in Fig. 1, and for any one of the propellers to be automatically feathered the other propellers must be unfeathered. If it is necessary to feather a second propeller after one has been automatically feathered, it is necessary for the pilot to manually operate the feather button 120 of the failed engine.

Negative torque signal

The negative torque signal control is essentially a mechanical control and consists of a projection 116 on the push rod 64 adapted to engage the lever 118 connected to the propeller pitch varying linkage 72, 68 and 66. If during any flight condition other than take-off, the horsepower transmitted from the engine E to the propeller should decrease to a zero value and should then become a negative horsepower of more than 400, there will be a negative reaction torque on the ring gear 26 which will cause it to move teeth 34 against the force of springs 44 in a counterclockwise direction. Except during take-off conditions, any power condition between the engine and prop within the range of positive 400 horsepower and negative 400 horsepower will result in the ring gear 26 being in its central or neutral position, the springs 44 acting to hold the ring gear 26 in that position. If due to power failure, fuel interruption, gusts of wind acting on the propeller, etc., the power passing between the engine and the propeller decreases to more than 400 negative horsepower, the ring gear 26 will begin to rotate counterclockwise from its central position into its negative torque signal range. This will cause the projection 116 on the push rod 64 to move the lever 118 and the propeller control linkage to increase the pitch of the propeller thereby reducing the drag effect of the propeller 7 on the aircraft. Increasing the pitch or blade angle of the propeller decreases the negative horsepower between the propeller and the engine and when the blade pitch has been increased sufficiently to reduce the negative horsepower below 400, the centering springs 44 will move the ring gear 26 and tooth 60 clockwise to decrease the propeller pitch to maintain the negative horsepower at 400. The spring rate of springs 44 can be chosen to provide the same maximum negative horsepower, maximum as the positive horsepower, for example 445. This maximum negative horsepower is that sufficient to move the ring gear 26 to its extreme counterclockwise position, wherein the propeller is in its extreme pitch or feathered position. The gear 26 and propeller pitch control will move out of the maximum pitch condition upon resumption of power from the engine E to the propeller, or cessation of the wind gust acting on the propeller, whichever the case may be.

In order to provide for desirable reverse thrust from the propeller, such as after landing the aircraft, to obtain negative thrust braking of the aircraft a control can be provided whereby when the power lever 92 is moved down from its flight idle position into a reverse thrust position the negative torque signal control will be disarmed. This disarming feature which forms no part of the invention is not shown but may be any mechanical or electrical control operated by the power lever 92.

Operation

The automatic feathering control is designed only for operation during the take-off and only when the pilot has armed the system by closing the manual arming switch 88. Thereafter any reduction in positive horsepower from the engine to the propeller to a value below a predetermined amount as determined by the preloading force of springs 44, which for an example in the illustrated preferred embodiment is less than 400 positive horsepower will cause the propeller to automatically feather. Whenever the horsepower from the engine to the propeller is greater than 400 positive horsepower or any other horsepower determined by the value of springs 44, the ring gear will be in its extreme clockwise position shown in Fig. 1. If there is a power failure such that the horsepower from the engine to the propeller drops below 400, the reaction force on gear 26 will drop and allow springs 44 to move the ring gear and tooth 60 counterclockwise, making cam 74 close the switch 76 completing the automatic feathering circuit. The solenoid 100 then moves the propeller pitch control to full feather position and the hold-down solenoid 104 is energized to hold the feather system in feather condition. The fuel supplied to the engine E is simultaneously cut off by the solenoid 108 closing the fuel valve 110.

The negative torque system which is intended to limit the negative horsepower from the propeller to the engine to a predetermined safe value, which in the illustrated embodiment has been taken as 445, is intended to function during all flight conditions other than take-off. Any power condition between 400 positive horsepower and 400 negative horsepower will have no effect on the propeller pitch so long as the manual arming switch 88 is open or the power take-off lever is any position other than power take-off. If for some reason such as a momentary power failure, gust of wind on the propeller or other cause, the power should decrease to more than 400 negative horsepower, the negative torque reaction acting on ring gear 26 will move the same and its tooth 60 to the right whereby projection 116 will move lever 118 and link 72 to increase the pitch of the propeller, to reduce the drag on the aircraft, and to thereafter maintain the negative horsepower less than a predetermined value which in the illustrated embodiment is 445 horsepower. During landing procedures when it is desired to slow the aircraft by a controlled drag which would result from the pilot positioning the power lever 92 in a position below the flight idle position, the negative torque signal control will limit the drag on the aircraft to a safe value, for example 445 negative horsepower on each power section. It will be noted that the negative torque signal for each power section can operate simultaneously whereas the automatic feathering control will operate only on a single power section after a power failure in that power section and any further full feathering in other sections must be manually controlled by the pilot.

Other types of control systems including mechanical and hydraulic as well as electrical can be used with the invention and other embodiments and applications will occur to others that can be used without departing from the spirit of the invention.

What is claimed is:

1. In a propulsion system, in combination, an engine, a stationary housing, gearing within the housing driven by the engine, a variable pitch propeller driven by the gearing, said gearing including a reaction gear mounted in said housing for limited relative rotation between two extreme positions, biasing means carried by said housing and acting on said reaction gear to center the same between the two extreme positions to a centered position, pitch control means for varying the pitch of said propeller, and means connected to said reaction gear and said pitch control means responsive to movement of the reaction gear between one of said extreme positions and the centered position to feather the propeller and responsive to movement of the reaction gear between the centered position and the other of said extreme positions to increase the pitch of said propeller.

2. In a propulsion system, a source of power, a variable pitch propeller, control means for changing the pitch of said propeller, reduction gearing connecting said power source with said propeller, said reduction gearing including a gear set having a reaction gear, said reaction gear being mounted for limited rotational movement in one direction from a center position in response to positive torque drive more than a predetermined amount from said power source to said propeller and limited rotational movement in the opposite direction from the center position in response to negative torque drive more than a predetermined amount from said power source to said propeller, and means responsive to movement of said reaction gear in said opposite direction toward said center position connected to said control means for controlling the pitch of said propeller in response to said limited rotational movement of said reaction gear and responsive to movement of said reaction gear in said opposite direction away from said center position for controlling the pitch of said propeller.

3. In a propulsion system, in combination, an engine, a variable pitch propeller, gearing means connecting said engine and propeller, said gearing means including a reaction gear, a housing for said gearing, said reaction gear being mounted in said housing for limited rotational movement between two extreme positions, biasing means carried by said housing acting on said reaction gear to hold it centered between said extreme positions, said biasing means having a given preload force, whereby said reaction gear will move from its centered position against said biasing means to one of its extreme positions when the reaction force on the gear is in one direction and is greater than said preload force and will move from its centered position to its other extreme position when the reaction force on the gear is in the opposite direction and is greater than the said preload force, and control means for varying the pitch of said propeller connected to said reaction gear to vary the pitch in response to movement of said reaction gear between one extreme position and its centered position and for varying the pitch of asid propeller in response to movement of said reaction gear between its centered position and said other extreme position.

4. In a propulsion system, in combination, an engine, a variable pitch propeller adapted to be moved to a feathered position, gearing means connecting said engine and propeller, said gearing means including a reaction gear, a housing for said gearing, said reaction gear being mounted in said housing for limited rotational movement between two extreme positions, biasing means carried by said housing acting on said reaction gear to hold it centered between said extreme positions, said biasing means having a given preload force, whereby said reaction gear will move from its centered position against said biasing means to one of its extreme positions when the reaction force on the gear is in one direction and is greater than said preload force and will move from its centered position to its other extreme position when the reaction force on the gear is in the opposite direction and is greater than the said preload force, and pitch control means connected to said propeller and said reaction gear adapted to move the propeller to feathered position in response to movement of said reaction gear from one of its extreme positions to its centered position, and adapted to increase the propeller pitch when the reaction gear is moved between its said centered position to its other extreme position.

5. The propulsion system set forth in claim 4 wherein selective control means are provided for preventing the pitch control means from feathering the propeller when the reaction gear is moved from its one extreme position to its centered position.

6. The propulsion system set forth in claim 4 wherein holding means are provided for holding said pitch control means in propeller feather condition after movement of said reaction gear from its extreme position to its centered position even though the reaction force on said reaction gear increases to move said reaction gear from its centered position to its one extreme position.

7. In a torque sensing device for determining the direction and magnitude of torque transmitted between two connected elements, each element capable of driving the other, the combination of a planetary gear set connecting the elements, said gear set having a gear adapted when held against rotation to provide reaction torque for drive between the elements, said reaction torque tending to rotate said gear in one direction during transmission of drive from a first of the elements to the other element and in the opposite direction during transmission of drive from the other element to the first element, holding means for said gear, said gear and holding means having stop means permitting a limited relative movement therebetween, and biasing means carried by said holding means for resisting relative movement between said gear and holding means, said biasing means having a predetermined loading force between said gear and holding means, whereby the gear and holding means are held against relative movement until the reaction force on said gear caused by drive between said elements tending to move said gear, in either direction against said biasing means, is greater than the predetermined loading force.

References Cited in the file of this patent

UNITED STATES PATENTS

| | | |
|---|---|---|
| 2,595,345 | Engelhardt et al. | May 6, 1952 |
| 2,618,927 | Chandler | Nov. 25, 1952 |
| 2,751,026 | Lee | June 19, 1956 |
| 2,801,701 | Coar | Aug. 6, 1957 |